Jan. 19, 1943.  J. F. BOLTON  2,308,670
MEANS FOR SEPARATING MATERIALS OF DIFFERENT PHYSICAL CHARACTERS
Filed Feb. 10, 1940  3 Sheets-Sheet 1

INVENTOR:
JAMES FRANKLAND BOLTON
BY: Francis E. Boyce
ATTORNE

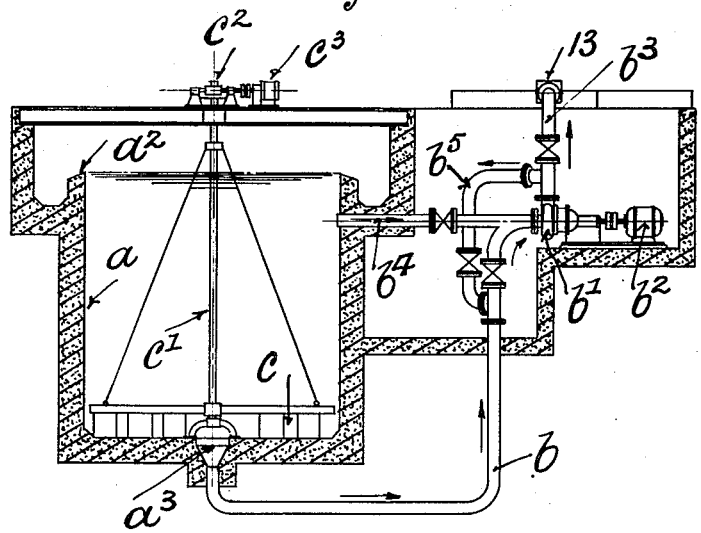
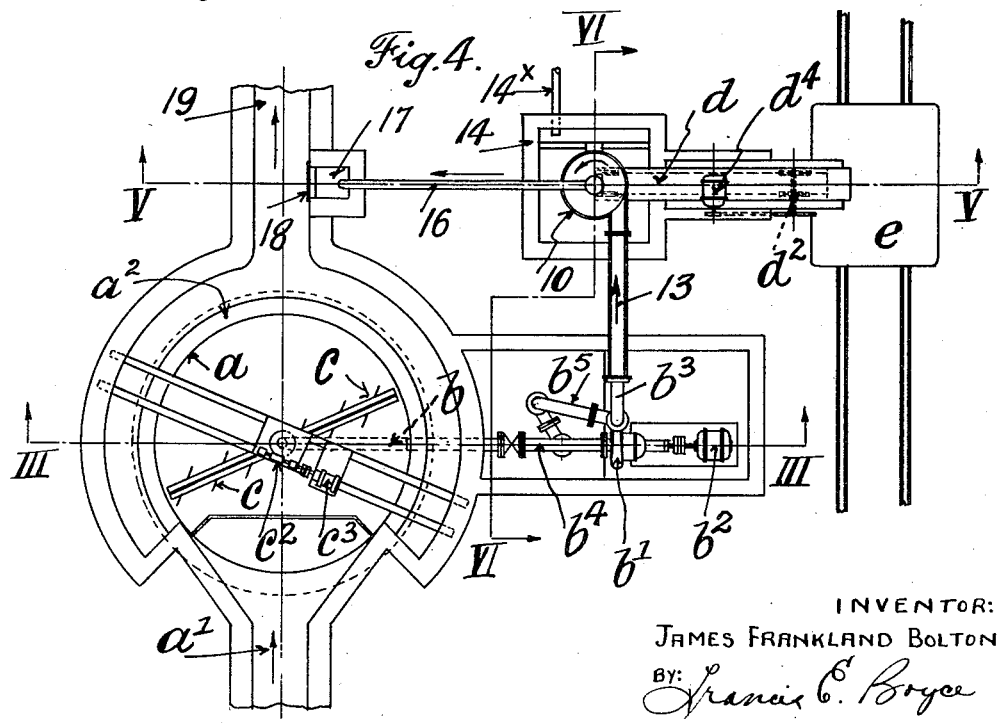

Jan. 19, 1943.  J. F. BOLTON  2,308,670
MEANS FOR SEPARATING MATERIALS OF DIFFERENT PHYSICAL CHARACTERS
Filed Feb. 10, 1940  3 Sheets-Sheet 3
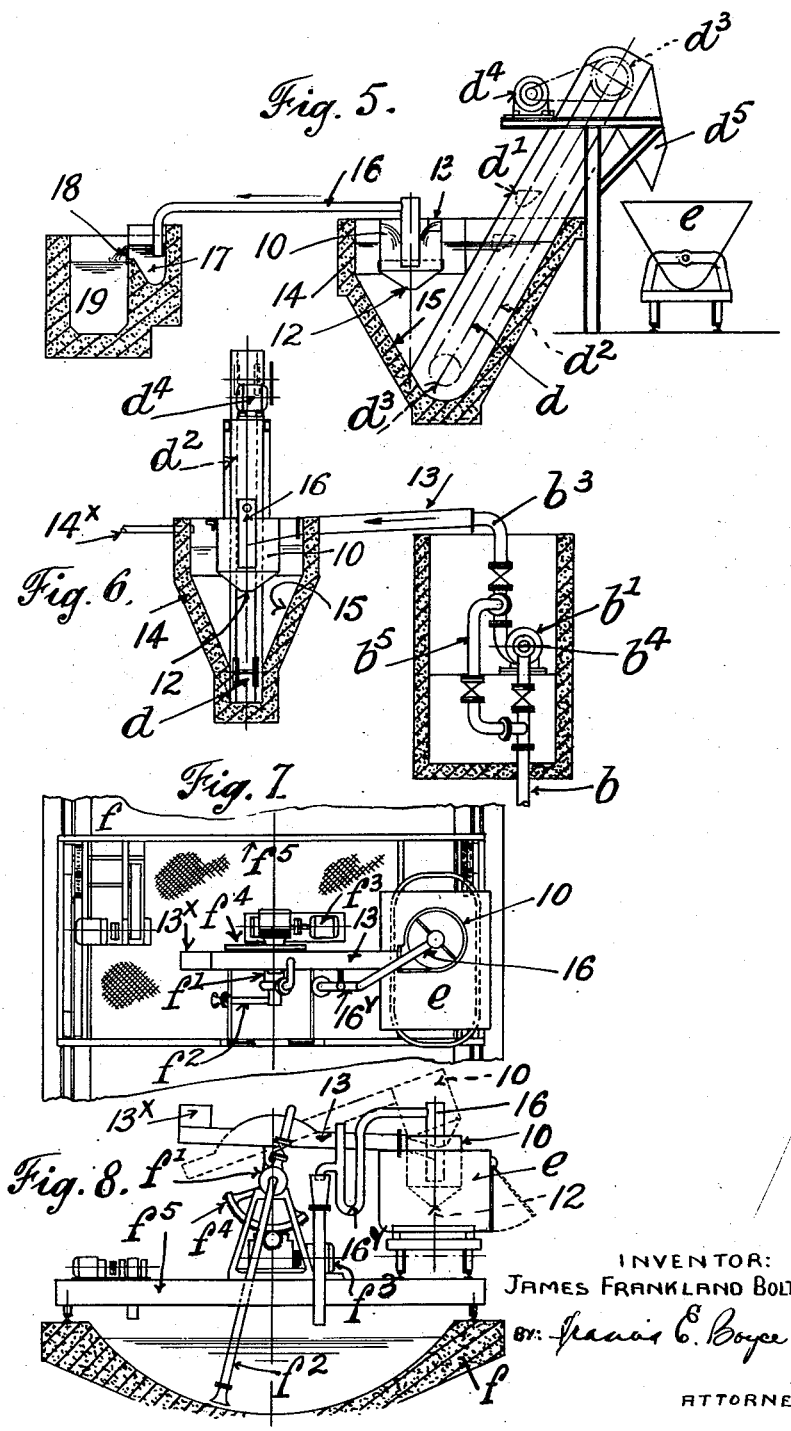
INVENTOR:
JAMES FRANKLAND BOLTON
BY: Francis E. Boyce
ATTORNEY Patented Jan. 19, 1943

2,308,670

UNITED STATES PATENT OFFICE 2,308,670

MEANS FOR SEPARATING MATERIALS OF DIFFERENT PHYSICAL CHARACTERS

James Frankland Bolton, Heywood, England

Application February 10, 1940, Serial No. 318,253
In Great Britain February 11, 1939

5 Claims. (Cl. 210—3)

This invention relates expressly to settling tanks or apparatus for the treatment of sewage with the object of more efficiently separating and removing from the liquid treated in such settling tanks or apparatus, such materials as grit, sand and heavy solids.

The apparatus makes use of a separating or vortex chamber into which the liquid is delivered tangentially and having a conical base with central delivery aperture through which the heavy solids fall into an outer vessel containing still liquid, the liquid and lighter solids in the separating or vortex chamber being conveyed away, and which means are known for separating heavy solids from liquid.

According to the present invention and for the particular purpose of treating sewage we combine with the known settling tank or basin, apparatus for the removal and separation of the grit and heavy solids comprising a pump which collects said heavy solids from the bottom of the settling tank or basin and delivers same into a duct discharging tangentially into a separating chamber with conical base having a central aperture through which the heavy solids fall into still liquid in an outer vessel for removal therefrom, the aforesaid separating chamber being furnished with a syphon functioning to remove the lighter solids and liquid from the separating chamber in automatic manner and to deliver same to the outlet from or to the said settling tank or basin.

Apparatus according to the invention as hereinbefore defined is illustrated in the accompanying drawings, wherein:

Figs. 3 to 6 illustrate an arrangement of the complete apparatus having a circular settling tank with rotating scrapers, Fig. 4 being a plan view, whilst Figs. 3, 5 and 6 are vertical sections taken respectively on the lines III—III, V—V and VI—VI in Fig. 4.

Figs. 7 and 8 illustrate another arrangement of the complete apparatus making use of a settling tank or basin and associated apparatus such as is described and shown in the specification of British Patent No. 461,287, Fig. 7 being a plan view and Fig. 8 an elevation.

Figure 1:
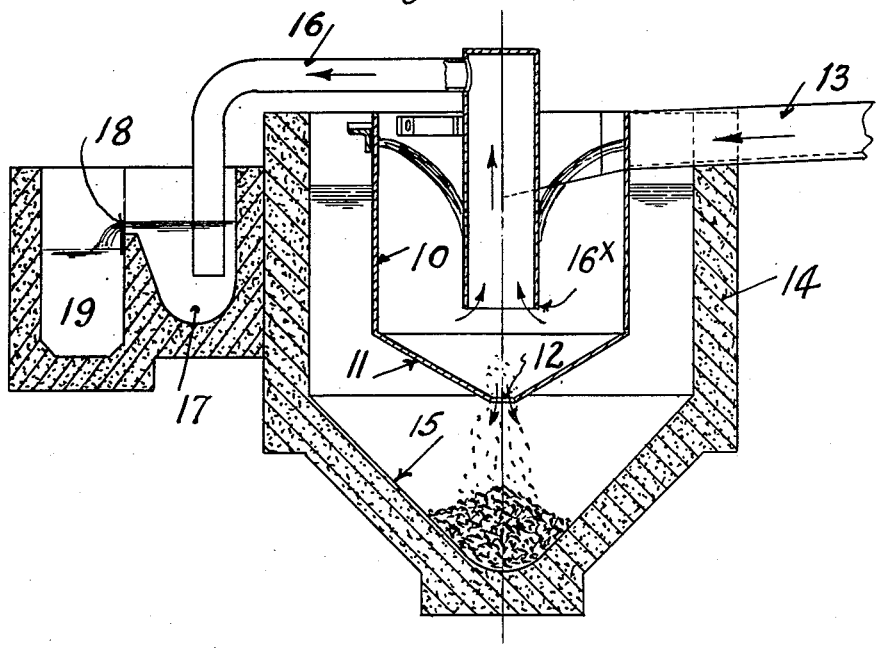
Figs. 1 and 2 illustrate in a simple form the part of the complete apparatus where the separation takes place, Fig. 2 being a plan view and Fig. 1 a section taken on the line I—I in Fig. 2.

The direction of movement of the different materials and liquids is shown in the drawings by the arrows.

Figure 2:
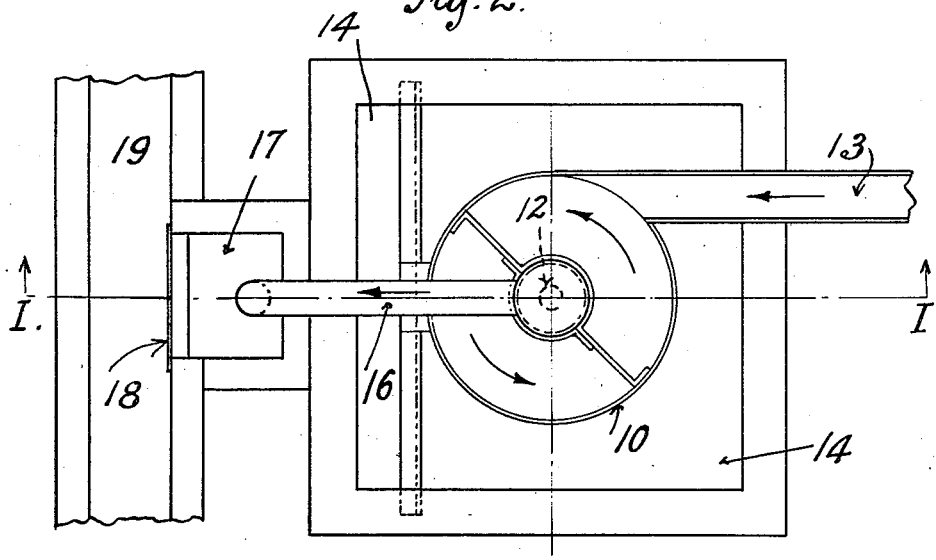

Referring first to Figs. 1 and 2, there is shown a separating chamber 10 of cylindrical form with conical bottom 11 having an outlet aperture 12, and a sloping duct 13 leads tangentially into this chamber near the top. This separating chamber 10 is supported in a surrounding outer vessel 14 containing comparatively still water or other liquid and having a sloping bottom 15, the chamber 10 and vessel 14 being in permanent communication through the outlet aperture 12. Centrally disposed in the separating chamber 10 is one leg of a syphon pipe 16 with its open lower end 16$^x$ some distance above the bottom of the chamber, the other leg of the syphon depending into a well 17 adjoining a delivery channel 18.

The heavy solids from the sewage, together with a varying proportion of organic matter and liquid, are collected as hereafter described and are delivered along the duct 13 into the separating chamber 10 at such a speed as to cause the necessary vortex or whirling effect. The result is that the heavier or less buoyant materials (such as grit) move towards the centre of the conical bottom 11 and fall through the outlet aperture 12 into the sloping bottom 15 of the outer vessel 14, whilst the lighter or more buoyant materials together with all the liquid flowing into the separating chamber are syphoned out into the well 17 and can flow over a weir 18 into the delivery channel 19.

Since the separating chamber 10 is always in communication with the outer vessel 14 through the outlet aperture 12, the level of the liquid in the vessel 14 will automatically adjust itself to correspond with the effective level in the chamber 10. During normal working, the heavier materials falling through the outlet aperture 12 displace some of the still liquid which flows gently up through such aperture into the chamber 10, and this without disturbing the separation process. Thus the separation can continue for some time until the heavier materials in the bottom of the vessel 14 have to be removed. Or, the process can be made really continuous by continually or at frequent intervals removing such heavier materials by means of a bucket elevator or suction pipe. When such removal takes place, there would be a slight flow of liquid down through the aperture 12 to maintain the levels, but this would generally not be sufficient to interfere with the separation process. Where this downward flow might cause interference, however, additional liquid would be supplied to the vessel 14 to prevent such downward flow—furthermore, such additional liquid could be introduced at a slightly greater rate so as to cause a gentle flow upwards through the aperture 12 into the chamber 10, thus helping to prevent the lighter materials from escaping downwards with the heavier materials.

Referring now to the complete apparatus illustrated in Figs. 3 to 6, the crude sewage (preferably after preliminary screening) flows along an inlet channel $a^1$ into a circular settling tank $a$ where all grit and other heavy solids can settle at all likely rates of flow of the incoming sewage. This tank $a$ is of substantially known construction, having a sill $a^2$ over which the liquid portion of the sewage flows to the delivery channel 19, and a central well $a^3$ in the flat bottom into which the deposited heavy solids are directed by inclined scrapers $c$ supported from a vertical shaft $c^1$ driven through gearing $c^2$ by a motor $c^3$.

These heavy solids, together with a varying proportion of organic matter and liquid, are then drawn up through suction pipe $b$ by a pump $b^1$ driven by a motor $b^2$ and are delivered through delivery pipe $b^3$ into the sloping duct 13 from which they flow tangentially into the separating chamber 10 as already described. Here all the lighter solids including all organic matter along with the whole of the liquid are removed through the syphon 16 and discharged into the delivery channel 19, whence they go for any desired subsequent purification treatment.

Additional water can be supplied to the outer vessel 14 as and when required, through a supply pipe $14^x$, and the sloping lower part 15 is shaped to co-operate with a bucket elevator $d$ which removes the grit and other heavy solids which have fallen through the outlet aperture 12. This elevator $d$ has a series of buckets $d^1$ carried on an endless chain or belt $d^2$ passing round wheels or rollers $d^3$, the upper one of which is driven by a motor $d^4$, and the buckets deliver down a chute $d^5$ into a wagon $e$. By this means, the heavy solids can be removed as fast as they are deposited, and the separation process can continue as long as may be desired.

Instead of a bucket elevator, suction means could be used to remove the deposited heavy solids.

In connection with the pump $b^1$ there is shown a pipe $b^4$ leading from near the top of the settling tank $a$ to the suction side of the pump, whilst a return pipe $b^5$ connects the delivery side of the pump to the suction pipe $b$, and valves are provided to enable clear liquid to be drawn from the top of the tank and pumped back through pipe $b$ into the well $a^3$ to clear any obstructions.

In the arrangement shown in Figs. 7 and 8 there is a tank or basin $f$ through which the crude sewage flows at such a speed as to deposit the heavy solids which it is desired to remove. These are then sucked off the curved bottom of the basin by a pump $f^1$ through an oscillating suction pipe $f^2$ which is swung to and fro across the basin by means of a motor $f^3$ arranged to actuate a toothed segment $f^4$ connected to the pipe $f^2$. This oscillating suction pipe $f^2$ is supported upon a travelling platform $f^5$ which also supports a wagon $e$ to receive the heavy solids.

The present invention makes use of such an apparatus by supporting the separating chamber 10 upon the end of the duct 13 which forms a support arm and into which the pump $f^1$ discharges the heavy solids, etc., and this arm is pivotally mounted upon the travelling platform $f^5$ and is counter-balanced by a weight $13^x$. The syphon pipe 16 is supported in connection with the duct 13 so as to be movable therewith, and it has a U-shaped leg $16^y$ which delivers the lighter solids, etc., back into the basin $f$. By this means, the separating chamber 10 can be lowered into the wagon $e$ which contains water and constitutes the equivalent of the outer vessel 14 described above, and the heavy solids, etc., fall from the chamber 10 and collect in the wagon. When the wagon is full enough, the duct 13 is tilted to lift the chamber 10 out (as shown in broken lines in Fig. 8), and the wagon can be removed and another one brought into position. Such an arrangement enables a very thorough separation and removal of the grit, etc., from the crude sewage to be made.

I claim:

1. Apparatus for separating solids from crude sewage, comprising in combination a settling tank having a sewage inlet channel and a liquid-delivery channel, a separating chamber having a conical bottom provided with a centrally disposed outlet opening, an outer vessel enclosing said separating chamber for receiving solids therefrom through said outlet opening, a pump communicating at its intake side with the bottom of said settling tank, a duct communicating at one end with the delivery side of said pump and having its opposite end communicating with said separating chamber in tangential relation thereto, and a syphon having one leg extending down into the separating chamber to a point near the bottom thereof, the opposite leg of the syphon being open to the liquid-delivery channel from the settling tank whereby the syphon will automatically remove liquid and lighter solids from the separating chamber.

2. Apparatus as set forth in claim 1, including mechanical means extending into said outer vessel for removal of solids from said vessel, and means for introducing a liquid into said vessel at a slightly greater rate than the rate of removal of solids.

3. Apparatus as set forth in claim 1, said settling tank having a well disposed centrally of its bottom, a rotatable scraping device within said tank for directing the solid contents of the tank toward said well, and means for rotating said scraping device.

4. Apparatus as set forth in claim 1, including a pair of rollers mounted for rotation one in said outer vessel below said separating chamber and the other above the outer vessel and out of vertical alinement with the first roller, an endless chain mounted on said rollers for traveling movement, buckets carried by said chain for removing solid material from said outer vessel, and means for operating said chain and rollers.

5. Apparatus for separating solids from crude sewage, comprising in combination a settling tank having a sewage inlet channel and a liquid-delivery channel, a separating chamber having a conical bottom provided with a centrally disposed outlet opening, an outer vessel enclosing said separating chamber for receiving solids therefrom through said outlet opening, a pump disposed between said settling tank and separating chamber, a pipe communicating with the intake side of the pump and having branches communicating with the settling tank respectively at its bottom and near the upper end of the tank, a pipe communicating with the delivery side of the pump, a duct communicating at one end with said delivery pipe and having its opposite end communicating with said separating chamber in tangential relation thereto, a by-pass pipe communicating at one end with the delivery pipe and at its opposite end with the branch communicating with the bottom of the settling tank, all of said pipes having valves so disposed that at one adjustment of said valves the pump will draw liquid from the upper part of the settling tank and deliver it at the bottom of the tank and at another adjustment of the valves the pump will draw material from the bottom of the tank and deliver it to said duct, and a syphon having one leg extending down into the separating chamber to a point near the bottom thereof, the opposite leg of the syphon being open to the liquid-delivery channel from the settling tank whereby the syphon will automatically remove liquid and lighter solids from the separating chamber.

JAMES FRANKLAND BOLTON.